Aug. 26, 1952
J. E. FRAUENHOLTZ
2,607,997
DEVICE FOR INDICATING THE SIZE BEARING
FOR SHAFTS OF UNKNOWN DIAMETER
Filed Aug. 15, 1950
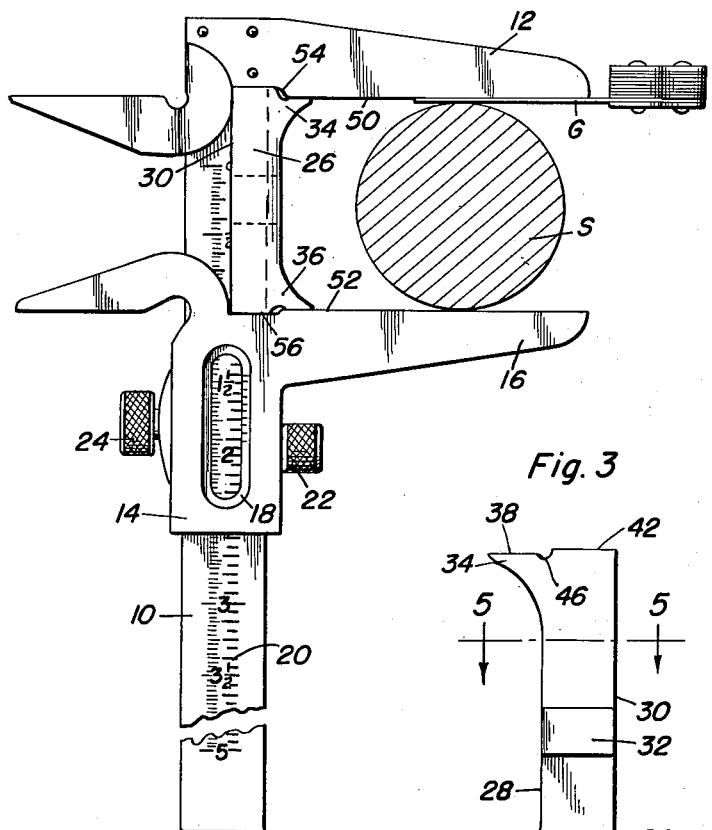
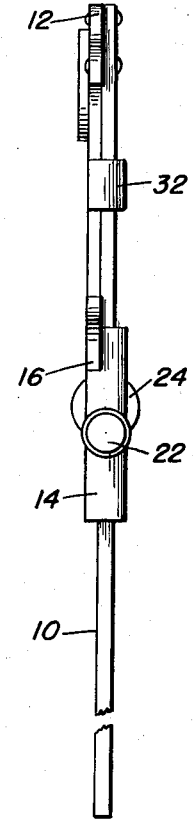
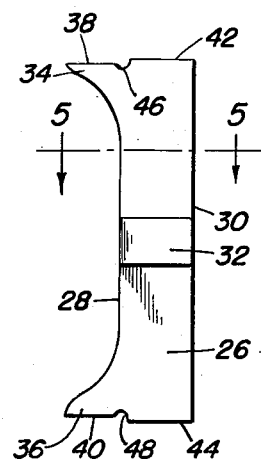
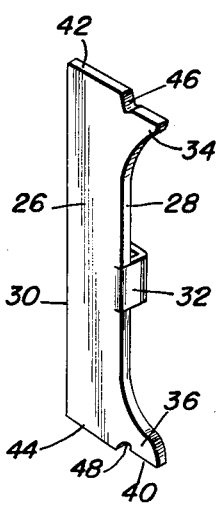
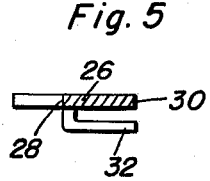
John E. Frauenholtz
INVENTOR.
BY *Clarence A. O'Brien*
and *Harvey B. Jacobson*
Attorneys Patented Aug. 26, 1952

2,607,997

UNITED STATES PATENT OFFICE 2,607,997

DEVICE FOR INDICATING THE SIZE BEARING FOR SHAFTS OF UNKNOWN DIAMETER

John E. Frauenholtz, Pittsburgh, Pa.

Application August 15, 1950, Serial No. 179,512

1 Claim. (Cl. 33—143)

This invention relates to new and useful improvements in gauges and the primary object of the present invention is to provide an attachment for gauges that will indicate the size bearing required for shafts of unknown diameter.

Another important object of the present invention is to provide a gauge plate of a predetermined length that is used with a caliper for indicating the size bearing required for a shaft received between the caliper jaws and thereby eliminating the heretofore procedure of measuring a shaft with a caliper and then determining the size bearing necessary through the use of a parts manual.

A further object of the present invention is to provide a bearing size indicating attachment for calipers that is quickly and readily applied to or removed from a caliper in a convenient manner without in any way harmfully affecting the caliper on which the same is attached.

A still further aim of the present invention is to provide a device of the aforementioned character that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is an elevational view of a conventional vernier calipers measuring a shaft and showing the present invention attached to the calipers;

Figure 2 is a side view of Figure 1 with the shaft removed;

Figure 3 is an elevational view of the present invention per se;

Figure 4 is a perspective view of the present invention; and

Figure 5 is a transverse horizontal sectional view taken substantially on the plane of section line 5—5 of Figure 3.

Referring now to the drawings in detail wherein for the purpose of illustration, there is disclosed a preferred embodiment of the present invention, the numeral 10 represents an elongated graduated blade or rule having a stationary jaw 12 secured thereto by any suitable means. A slide 14 is mounted on the rule 10 and supports a laterally projecting movable jaw 16 that parallels the jaw 12.

One wall of the slide 14 is provided with an elongated opening 18 that registers with the graduations and indicia 20 on the rule 10. The slide 14 is also formed with an internally threaded aperture that receivably engages a set screw 22. The screw is manually adjustable to bear against one edge of the rule 10 and thereby retain the slide longitudinally adjusted on the rule 10. An additional set screw 24 also carried by the slide 14 is manually adjusted to retain the slide longitudinally adjusted on the rule 10.

The present invention does not attempt to claim the above well known structure but is merely an attachment therefor that will permit the size bearing for a shaft of an unknown diameter to be determined in a minimum time. The device comprises an elongated flat, substantially rectangular plate 26 of resilient material having inner and outer longitudinal edges 28 and 30.

A tongue or ear 32 integrally formed with the inner edge 28 of the plate 26, and disposed intermediate the ends of the plate 26, is bent inwardly toward the plate 26 and cooperates with the plate 26 for yieldingly gripping the rule 10 therebetween and thereby retain the plate 26 upon the rule 10.

Lugs 34 and 36 are integrally formed with and project laterally from the edge 28 at the ends of the plate 26. The end edges 38 and 40 of the lugs 34 and 36 are inwardly offset from the end edges 42 and 44 of the plate 26 and recesses 46 and 48 are formed at the inner ends of the edges 38 and 40 to permit the edges 38 and 40 to engage the opposing edges 50 and 52 of the jaws 12 and 16 with the edges 42 and 44 entering notches 54 and 56 in the edges 50 and 52 of the jaws 12 and 16.

The plate 26 is of a predetermined length and will cooperate with the jaws 12 and 16 in indicating a proper bearing size. A group of plates 26 of various lengths are to be employed for use with shafts of various diameters. If the jaws 12 and 16 do not contact the ends of the plate 26, a feeler gauge G is employed and will indicate the play of a shaft S being measured with a plate 26 of a known length.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a gauge including a pair of relatively adjustable jaws, a device for determining the size bearing necessary for a shaft of an unknown diameter, said device comprising an elongated flat substantially rectangular plate of resilient material having inner and outer longitudinal edges, said inner edge having an elongated substantially U-shaped notch therein, and a tongue integrally formed with the inner edge of said plate and paralleling said plate, said tongue cooperating with said plate to yieldingly grip the gauge, the ends of said plate being shaped to conform to the opposing inner edges of the pair of caliper jaws.

JOHN E. FRAUENHOLTZ.

REFERENCES CITED

The following references are of record in the file of this patent:

UNITED STATES PATENTS

| Number | Name | Date |
|---|---|---|
| 387,284 | Dupee | Aug. 7, 1888 |
| 2,256,676 | Iverson | Sept. 23, 1941 |

FOREIGN PATENTS

| Number | Country | Date |
|---|---|---|
| 175,389 | Switzerland | May 1, 1935 |